US008091969B2

(12) United States Patent
Caveney et al.

(10) Patent No.: US 8,091,969 B2
(45) Date of Patent: Jan. 10, 2012

(54) WALL MOUNT CABINET SYSTEM

(75) Inventors: Jack E. Caveney, Hinsdale, IL (US); Samuel J. Adducci, Palos Heights, IL (US); Robert L. Fritz, Elwood, IL (US)

(73) Assignee: Panduit Corp., Tinley Park, IL (US)

( * ) Notice: Subject to any disclaimer, the term of this patent is extended or adjusted under 35 U.S.C. 154(b) by 1087 days.

(21) Appl. No.: 10/780,320

(22) Filed: Feb. 17, 2004

(65) Prior Publication Data

US 2005/0179348 A1    Aug. 18, 2005

(51) Int. Cl.
  *A47F 5/08* (2006.01)
(52) U.S. Cl. .................................... 312/248; 312/223.6
(58) Field of Classification Search .................. 312/240, 312/242, 245, 246, 248, 283, 285, 286, 290, 312/223.6, 223.1; 74/48, 49, 50, 65; 200/293, 200/297
  See application file for complete search history.

(56) References Cited

U.S. PATENT DOCUMENTS

| | | | |
|---|---|---|---|
| 3,006,498 A * | 10/1961 | Thiede et al. ................. 220/255 |
| 3,623,784 A * | 11/1971 | Neufeld ......................... 312/263 |
| 3,659,319 A * | 5/1972 | Erickson ......................... 24/304 |
| 3,794,395 A | 2/1974 | Damico et al. |
| 4,824,196 A | 4/1989 | Bylander |
| 5,065,968 A | 11/1991 | Kesler et al. |
| 5,239,129 A * | 8/1993 | Ehrenfels ........................ 174/51 |
| 5,367,598 A | 11/1994 | Devenish, III et al. |
| 5,408,045 A | 4/1995 | Jorgensen et al. |
| 5,568,362 A * | 10/1996 | Hansson ........................ 361/736 |
| 5,765,698 A * | 6/1998 | Bullivant ......................... 211/26 |
| 5,933,563 A * | 8/1999 | Schaffer et al. ............... 385/135 |
| 5,997,117 A | 12/1999 | Krietzman |
| 6,019,321 A * | 2/2000 | Carlson et al. .................. 248/49 |
| 6,061,966 A * | 5/2000 | Nelson et al. .................. 49/394 |
| 6,067,233 A * | 5/2000 | English et al. ................ 361/724 |
| 6,155,660 A * | 12/2000 | Nicolai ....................... 312/223.1 |
| 6,170,928 B1 * | 1/2001 | Eardley et al. ............. 312/223.1 |
| 6,185,098 B1 | 2/2001 | Benavides |
| 6,203,130 B1 | 3/2001 | Montgelas et al. |
| 6,394,398 B1 | 5/2002 | Reed et al. |
| 6,427,952 B2 | 8/2002 | Caveney et al. |
| 6,460,951 B1 | 10/2002 | Baxter et al. |
| 6,501,020 B2 | 12/2002 | Grant et al. |
| 6,504,100 B2 * | 1/2003 | Lawrence et al. ............. 174/100 |
| 6,613,981 B1 * | 9/2003 | Hathcock et al. ............... 174/69 |
| 6,755,493 B1 | 6/2004 | Krietzman et al. |

(Continued)

OTHER PUBLICATIONS

Chatsworth Products, Inc.'s Cube-iT PLUS wall mount cabinet brochure, 2 pages, 2002.

(Continued)

*Primary Examiner* — James O Hansen
(74) *Attorney, Agent, or Firm* — Robert A. McCann; Christopher S. Clancy; James H. Williams

(57) ABSTRACT

A wall mount cabinet is disclosed. The wall mount cabinet includes a rear section having a first end and a second end, and a front section hingedly connected to the rear section at a pivot point. The rear section has a cutout area adjacent the first end, and the cutout area allows access for cables to enter the cabinet. The pivot point is adjacent the cutout area and the first end of the rear section. The cutout area allows cables to rotate about the pivot point when the cabinet is moved from a closed position to an open position.

10 Claims, 16 Drawing Sheets

U.S. PATENT DOCUMENTS 6,946,600 B1 9/2005 Stoller et al.
7,097,047 B2 * 8/2006 Lee et al. .................. 211/26.2

OTHER PUBLICATIONS

Chatsworth Products, Inc.'s Cube-iT PLUS wall mount cabinet brochure, 4 pages, 2003.

Chatsworth Products, Inc.'s wall mount cabinet on-line catalog, section 2, 2 pages, Sep. 9, 2003.

Hubbell Premise Wiring's QuadCab wall mount brochure, 2 pages, Mar. 2002.

Hubbell Premise Wiring's QuadCab wall mount cabinet on-line product datasheet, 2 pages, May 2, 2003.

* cited by examiner

WALL MOUNT CABINET SYSTEM

BACKGROUND OF THE INVENTION

The present invention is directed to a telecommunications enclosure, and more particularly, to a wall mount cabinet system.

Hinged wall mount cabinets have been utilized in the telecommunications industry. For example, Chatsworth Products, Inc.'s Cube-It PLUS™ Wall Mount Cabinet mounts a rear section of a cabinet to a wall for receiving cables therein. The cables are threaded through openings or knockouts in the top side of the rear section, and cables are secured to the inside surface of the rear section utilizing a tie or fastener. Slack cable is provided in the rear section to allow the cabinet to move from a closed to an open position, without damaging the cables. Hubbell Premise Wiring's QuadCab™ Hinged Wall Mount Cabinet functions similarly to Chatsworth's Cube-It PLUS™ wall mount cabinet. However, none of the prior hinged wall mount cabinets provide a cutout area in the rear section of the cabinet and offer the ability to install cables without having to thread the cables through an opening or knockout. Moreover, none of the prior hinged wall mount cabinets allow cables passing vertically through the rear section to rotate about a pivot point where the front and rear sections of the cabinet connect, as the cabinet is moved from a closed to an open position.

Typically, hinged wall mount cabinets do not include slack cable managers secured therein. As known in the telecommunications industry, Category 5 and 5E cables are provided in one foot minimum lengths. Thus, slack cable management within the cabinet is not essential. However, as also known in the telecommunications industry, Category 6 cables are provided in three foot minimum lengths. Thus, slack cable managers may be desired within a cabinet for internal management of Category 6 cables. However, none of the prior hinged wall mount cabinets provide a slack cable manager secured within the cabinet.

SUMMARY OF THE INVENTION

It would be desirable to install cables without threading the cables through an opening or knockout in the rear section of a wall mount cabinet and to provide access to the inside of the cabinet without disturbing the cables positioned therein.

It would also be desirable to minimize cable movement within the wall mount cabinet when the cabinet is moved from a closed to an open position.

It would further be desirable to provide a slack cable manager secured within a wall mount cabinet for internal management of Category 6 cables.

A wall mount cabinet is disclosed. The wall mount cabinet includes a rear section having a first end and a second end, and a front section hingedly connected to the rear section at a pivot point. The rear section has a cutout area adjacent its first end, and the cutout area allows access for cables to enter the cabinet. The pivot point is adjacent the cutout area and the first end of the rear section. The cutout area allows cables to rotate about the pivot point when the cabinet is moved from a closed to an open position.

Preferably, the front section of the cabinet has a cable management ring secured thereon. When the cabinet is in a closed position, the cable management ring is vertically aligned with the cutout area. The cable management ring has a first arm and a second arm. Each of the arms is substantially L-shaped and has a distal portion oriented substantially 90 degrees from a substantially linear portion. Each arm is formed of a material and construction selected to provide rotation from a first 90 degree angle to a second 90 degree angle of the distal portion with respect to the proximate portion.

Preferably, the cabinet includes a hinged duct or transition duct positioned adjacent the cutout area.

Preferably, the cabinet includes two side access panels and a front door. The front door may include a transparent window.

Preferably, the cabinet includes a rod which maintains the front section in an open position about 90 degrees from the rear section.

Preferably, the front section of the cabinet includes a slack cable manager, a patch panel, a horizontal cable manager or active equipment secured to a rail mounted therein.

DETAILED DESCRIPTION OF PREFERRED EMBODIMENTS

Figure 12:
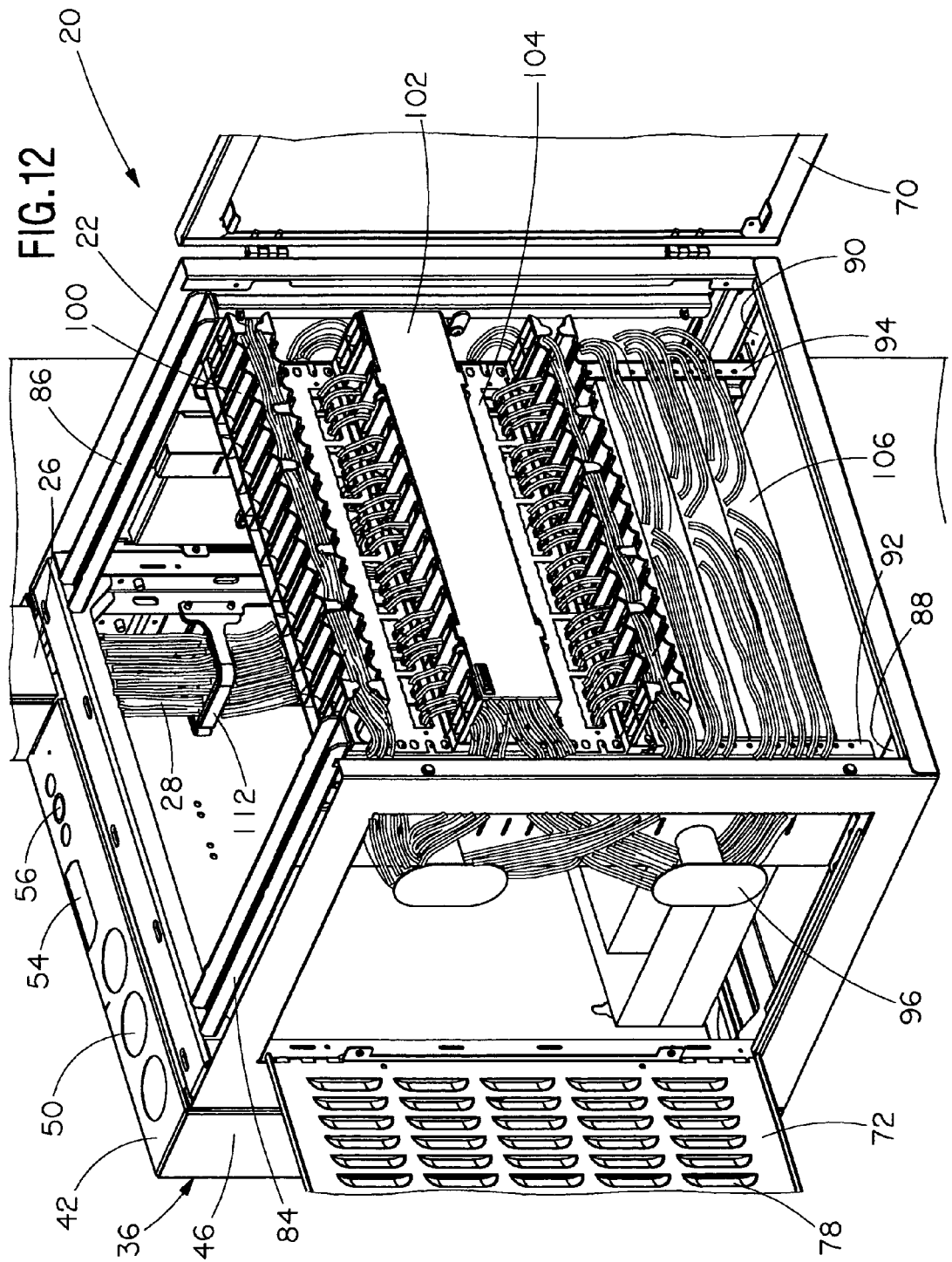
FIG. 12 is a top front left perspective view of the wall mount cabinet system of FIG. 4, showing cables and optional equipment installed therein.
Figure 13:
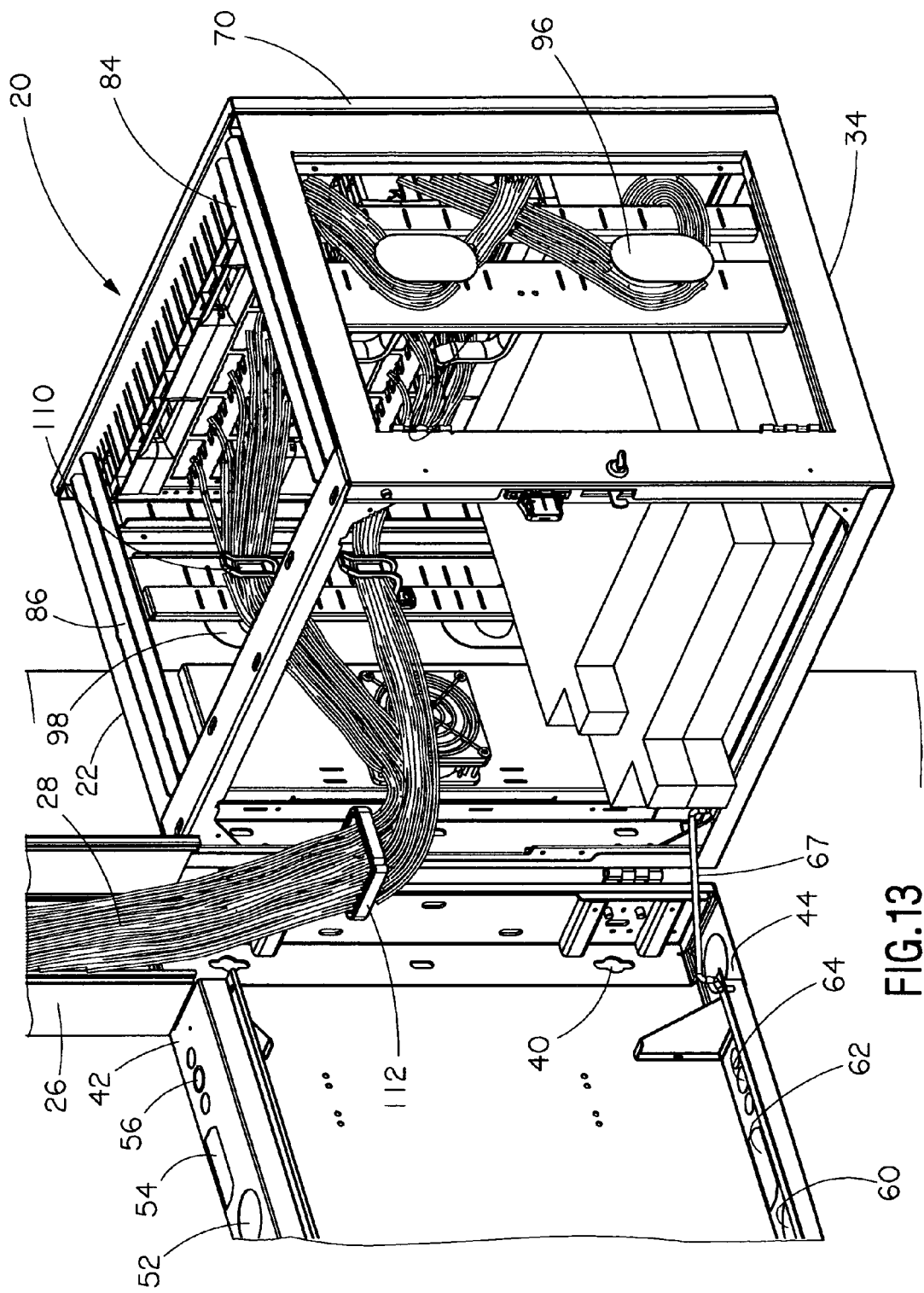
FIG. 13 is a top front left perspective view of the wall mount cabinet system of FIG. 5, showing cables and optional equipment installed therein.
Figure 14:
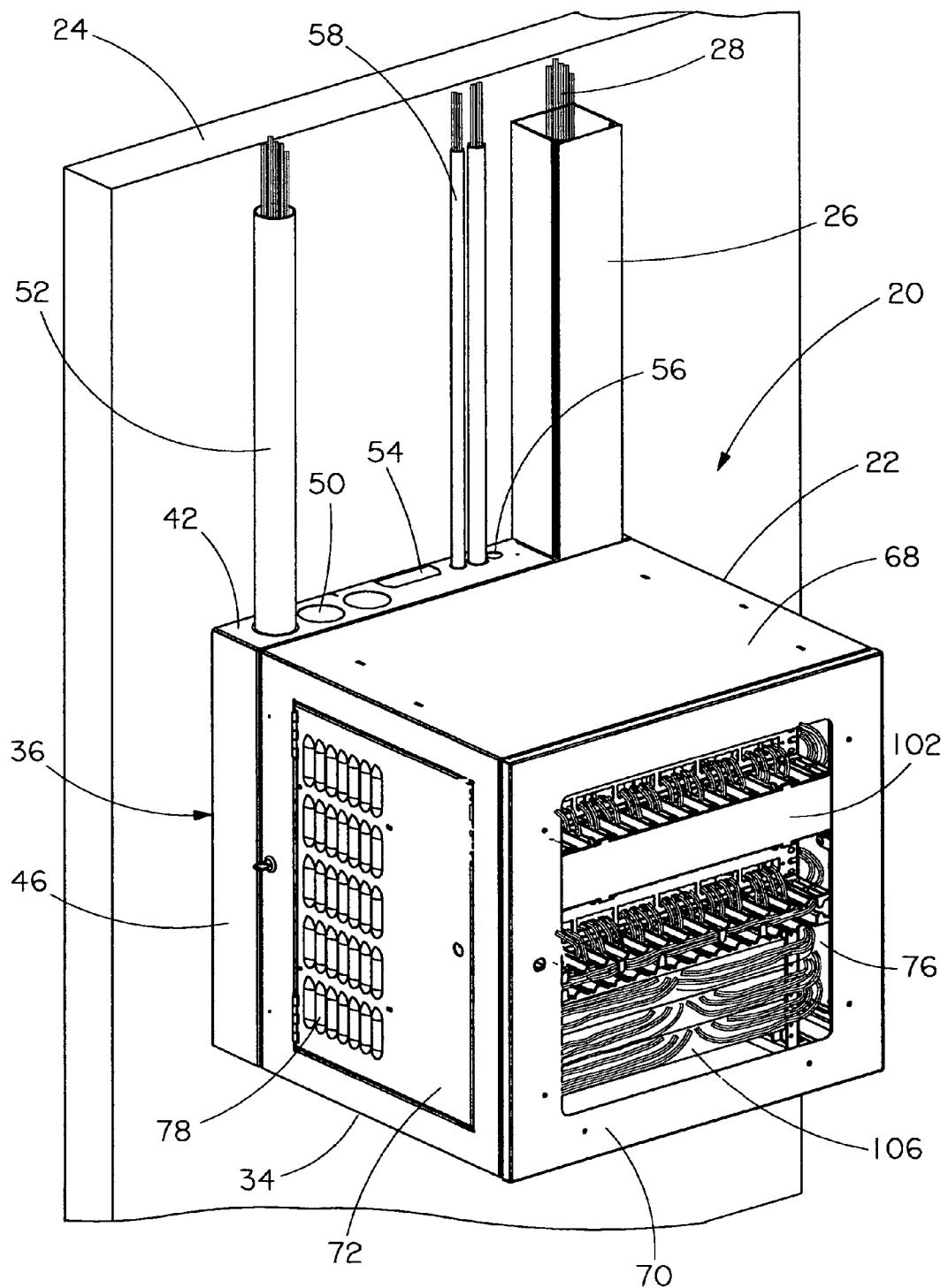
FIG. 14 is a top front left perspective view of the wall mount cabinet system of FIG. 1, showing the front door having a transparent window and conduit installed therein.
Figure 15:
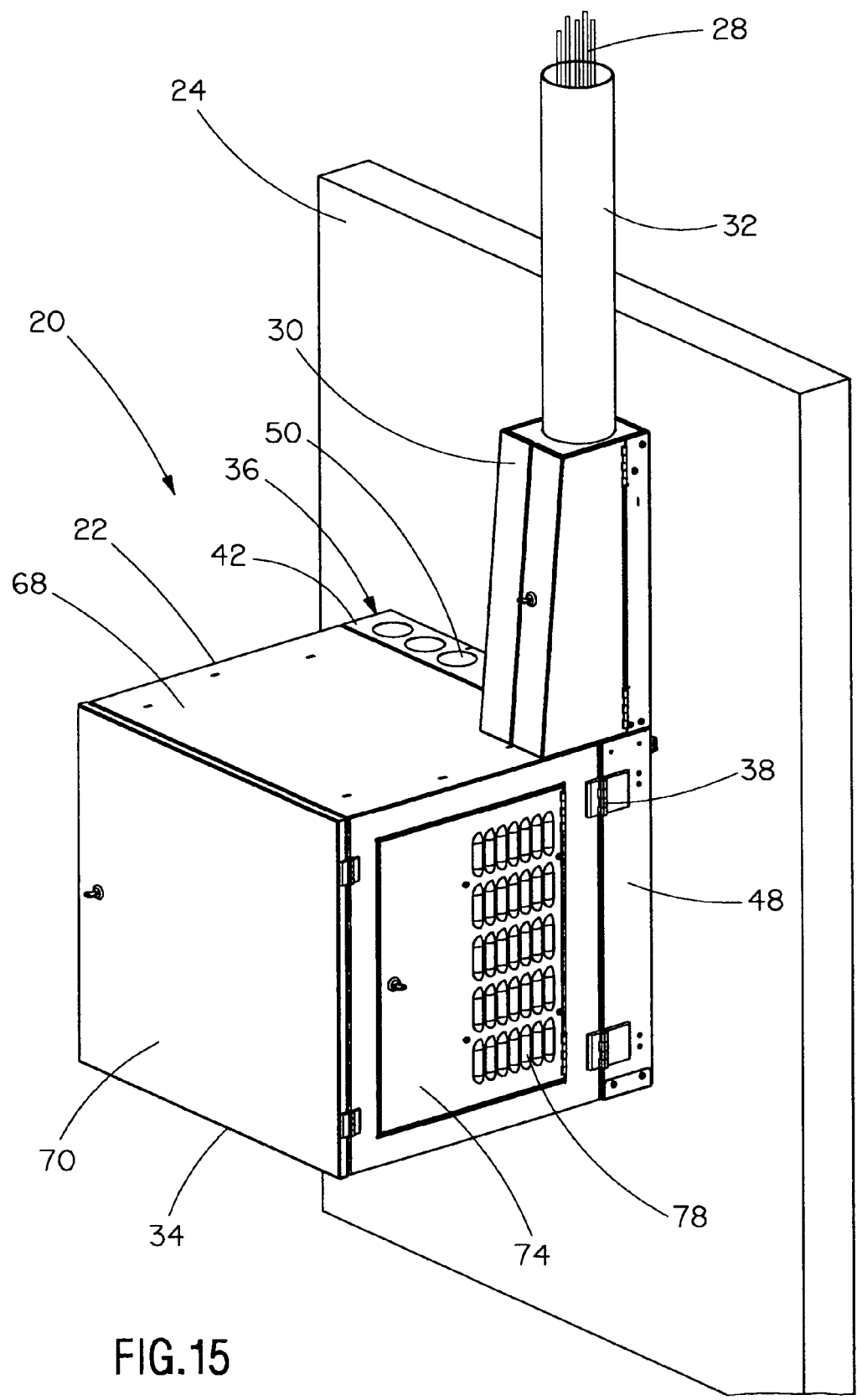
FIG. 15 is a top front right perspective view of the wall mount cabinet system of FIG. 2, showing a transition duct instead of a hinged duct.
Figure 16:
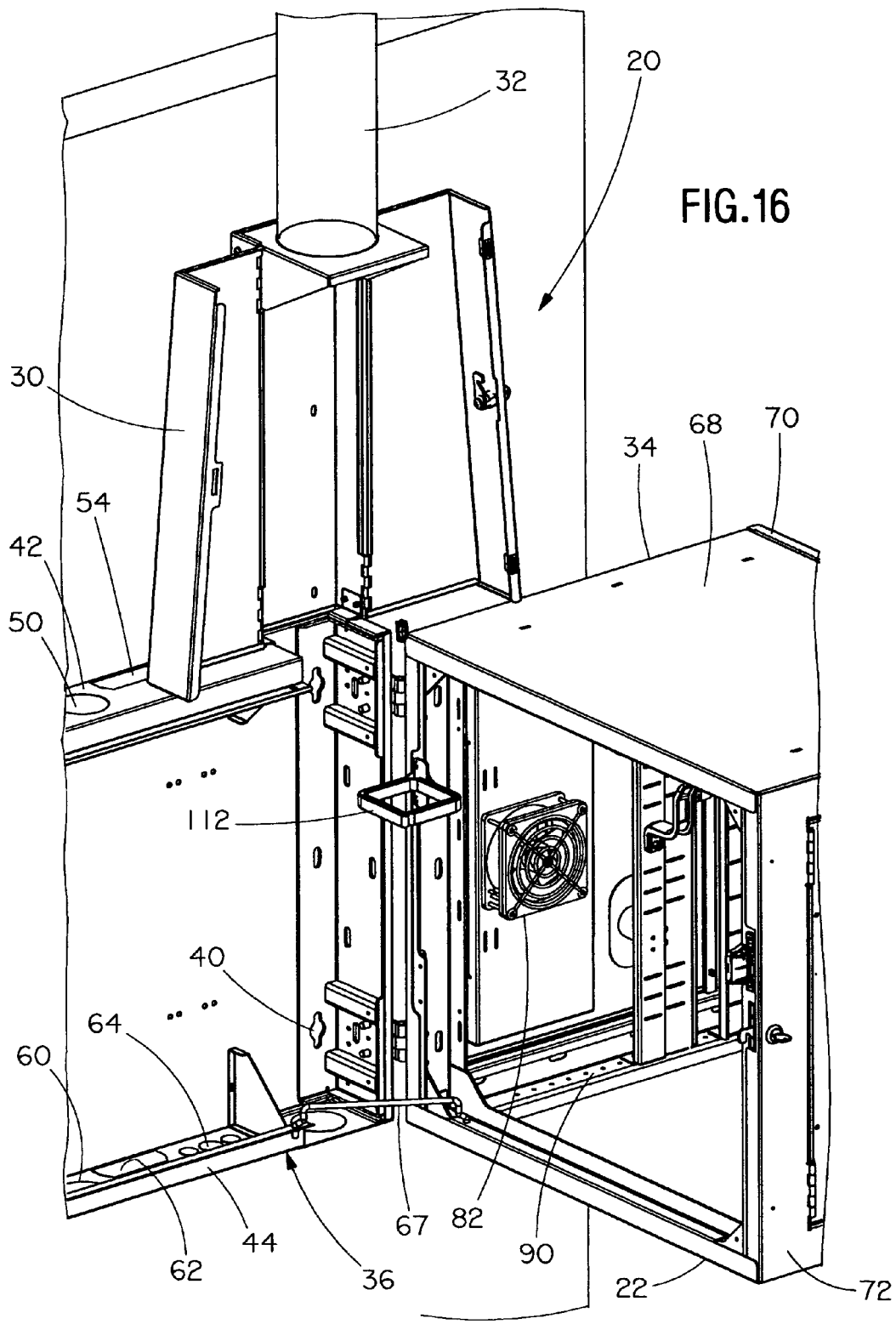
FIG. 16 is a top front left perspective view of the wall mount cabinet system of FIG. 12, showing the cabinet and transition duct in an open position.

The illustrated embodiments of the invention are directed to a wall mount cabinet system 20. FIGS. 1-14 show wall mount cabinet system 20 comprising a cabinet 22 mounted to a wall 24 and a hinged duct 26 for receiving cables 28 passing vertically therethrough. As best seen in FIG. 13, hinged duct 26 allows access to cables 28 when cabinet 22 is in an open position. Alternatively, as shown in FIGS. 15 and 16, transition duct 30 may be utilized instead of hinged duct 26. Transition duct 30 also allows access to cables 28 passing through conduit 32 when cabinet 22 is in an open position.

Figure 1:
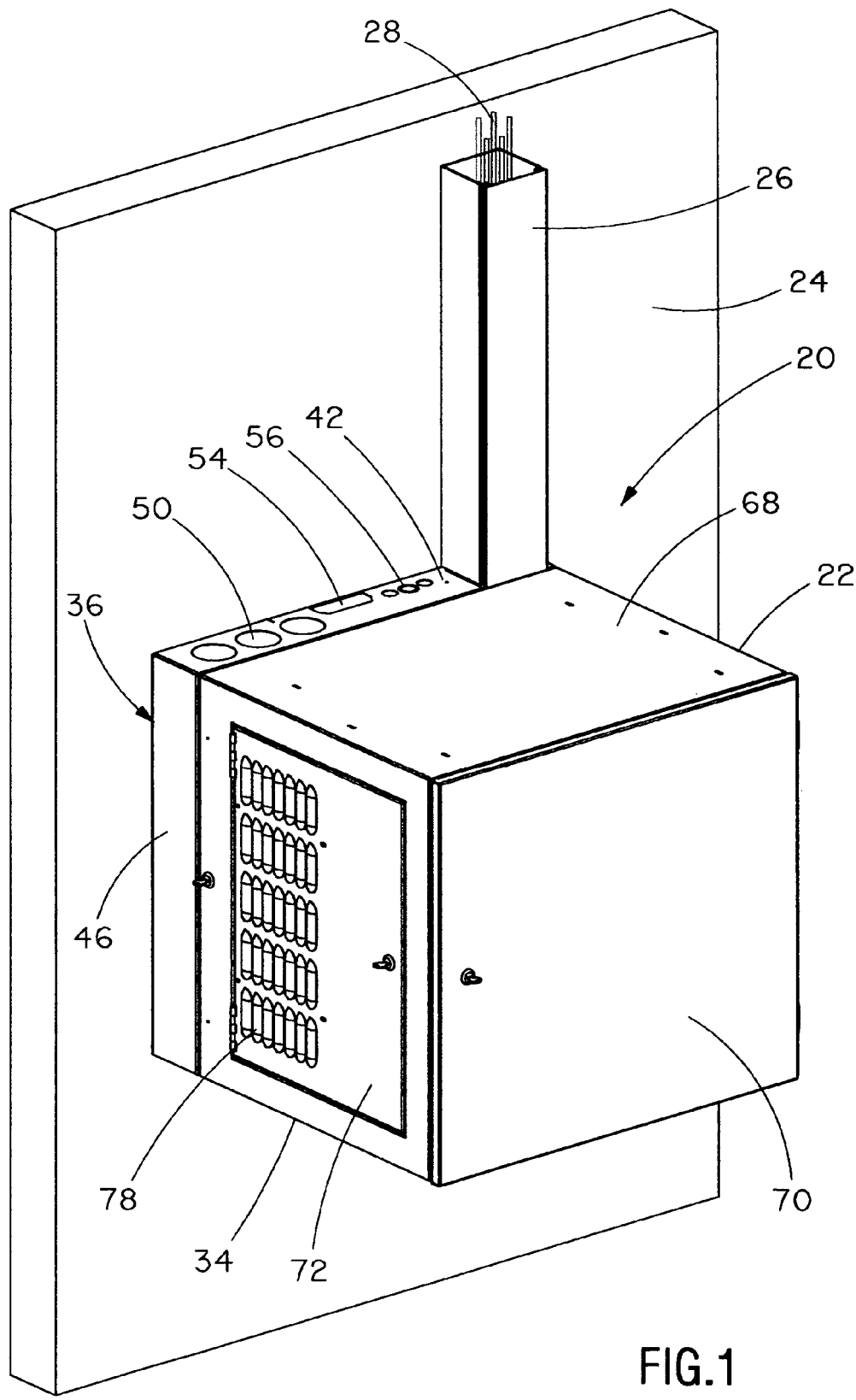
FIG. 1 is a top front left perspective view of a wall mount cabinet system according to the present invention.
Figure 2:
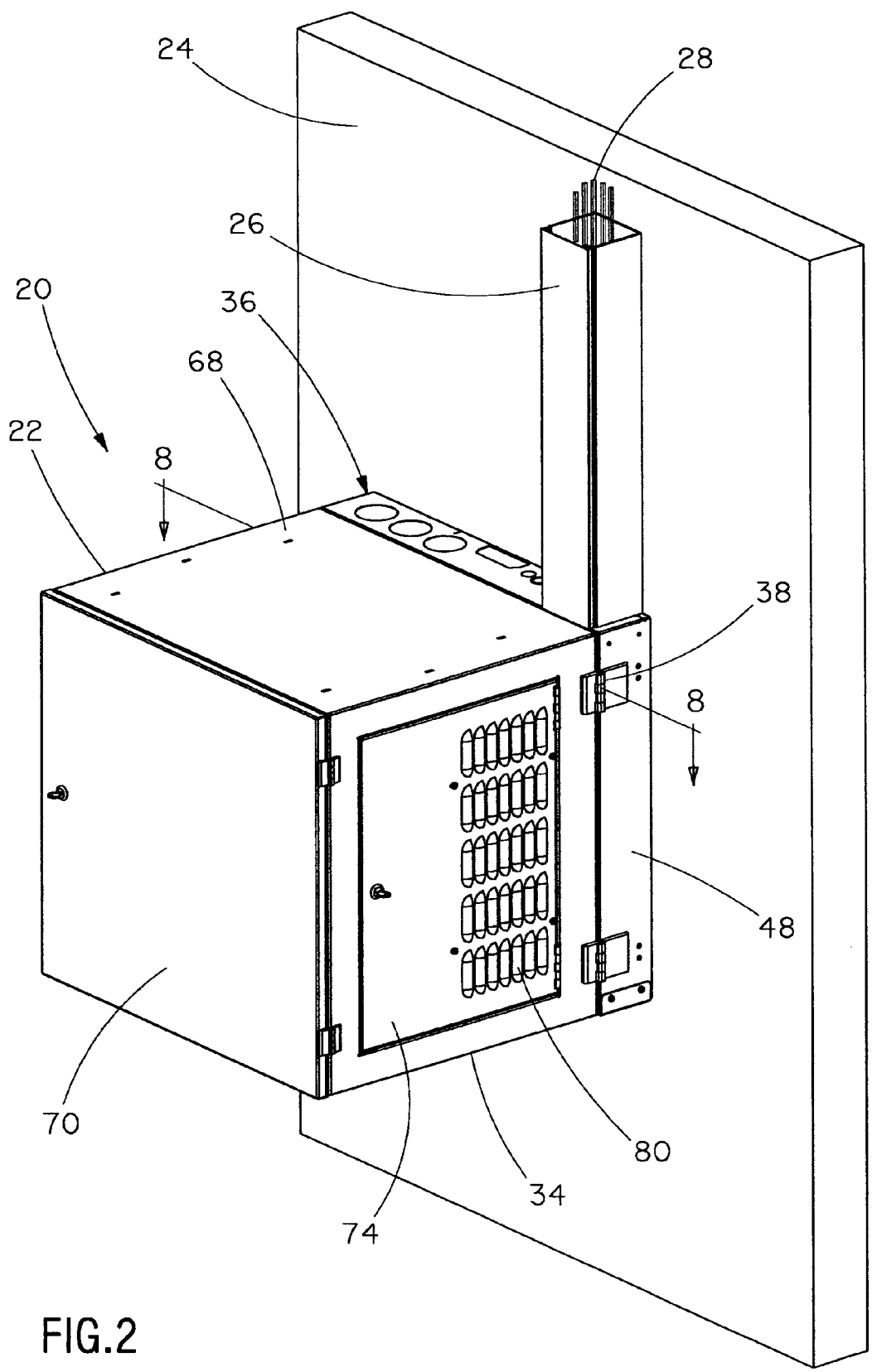
FIG. 2 is a top front right perspective view of the wall mount cabinet system of FIG. 1.
Figure 3:
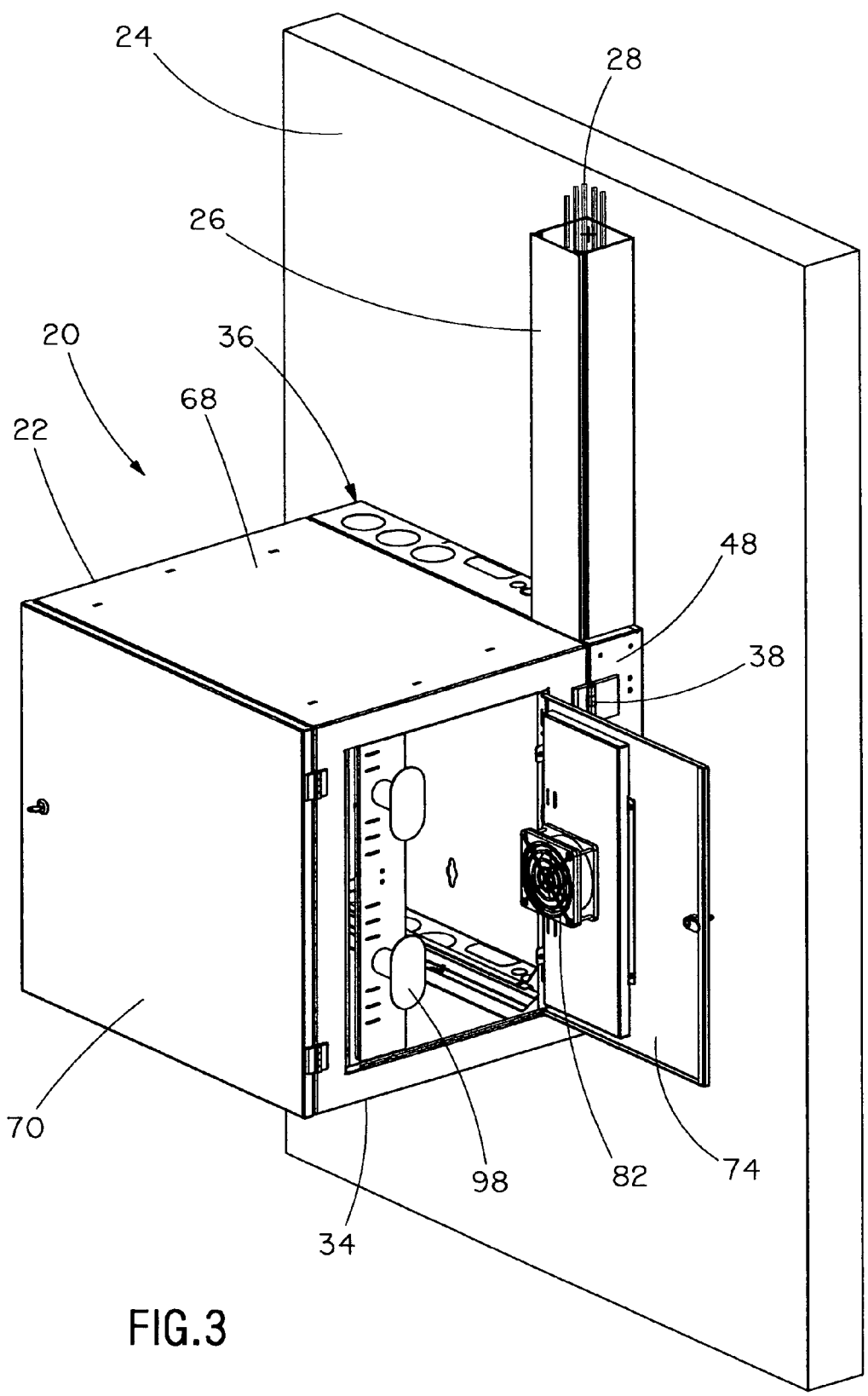
FIG. 3 is a top front right perspective view of the wall mount cabinet system of FIG. 2, showing the right side access panel in an open position.

As shown in FIGS. 1-3, cabinet 22 includes a front section 34 and a rear section 36. Front section 34 is hingedly connected to rear section 36 at a pivot point 38, shown in FIGS. 9 and 11, and rear section 36 is mounted to wall 24. As best seen in FIG. 5, rear section 36 includes four keyholes 40 for mounting rear section 36 to wall 24. Although rear section 36 is illustrated in FIGS. 1-16 mounted to wall 24, it is likewise contemplated that rear section 36 may be mounted to other structures, such as a 7/8 inch or 1 5/8 inch Unistrut® channel on a wall.

Rear section 36 has a top side 42, a bottom side 44, a left side 46 and a right side 48. As best seen in FIG. 5, top side 42 includes three knockouts 50 for receiving 2 inch diameter conduit 52 (see FIG. 14), a knockout 54 for receiving a raceway section, and three knockouts 56 for receiving ½ inch or ¾ inch diameter conduit 58 (see FIG. 14). Likewise, bottom side 44 includes three knockouts 60 for receiving 2 inch diameter conduit, a knockout 62 for receiving a raceway section, and three knockouts 64 for receiving ½ inch or ¾ inch diameter conduit.

Figure 9:
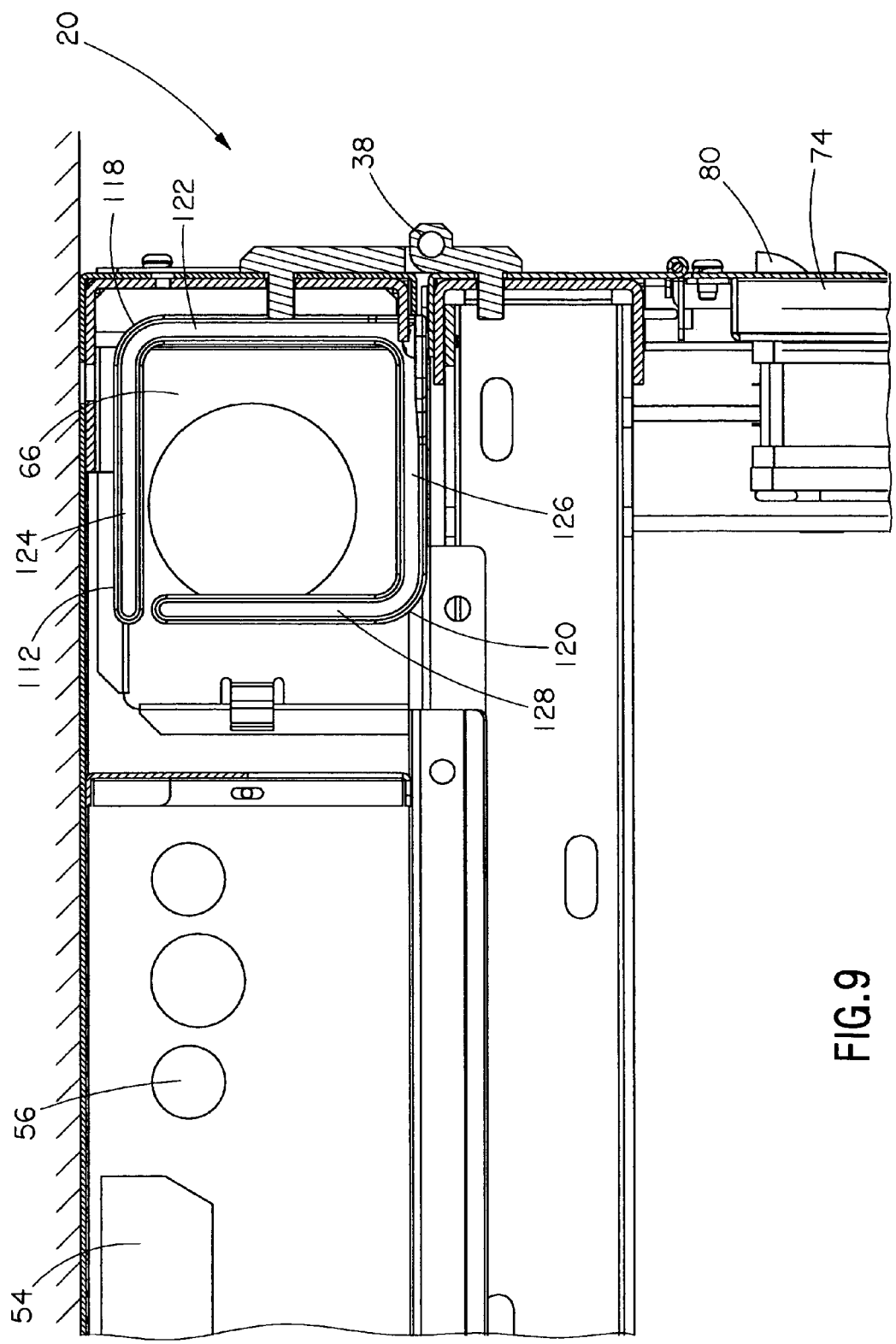
FIG. 9 is an enlarged view of the cable entrance area of FIG. 8.
Figure 10:
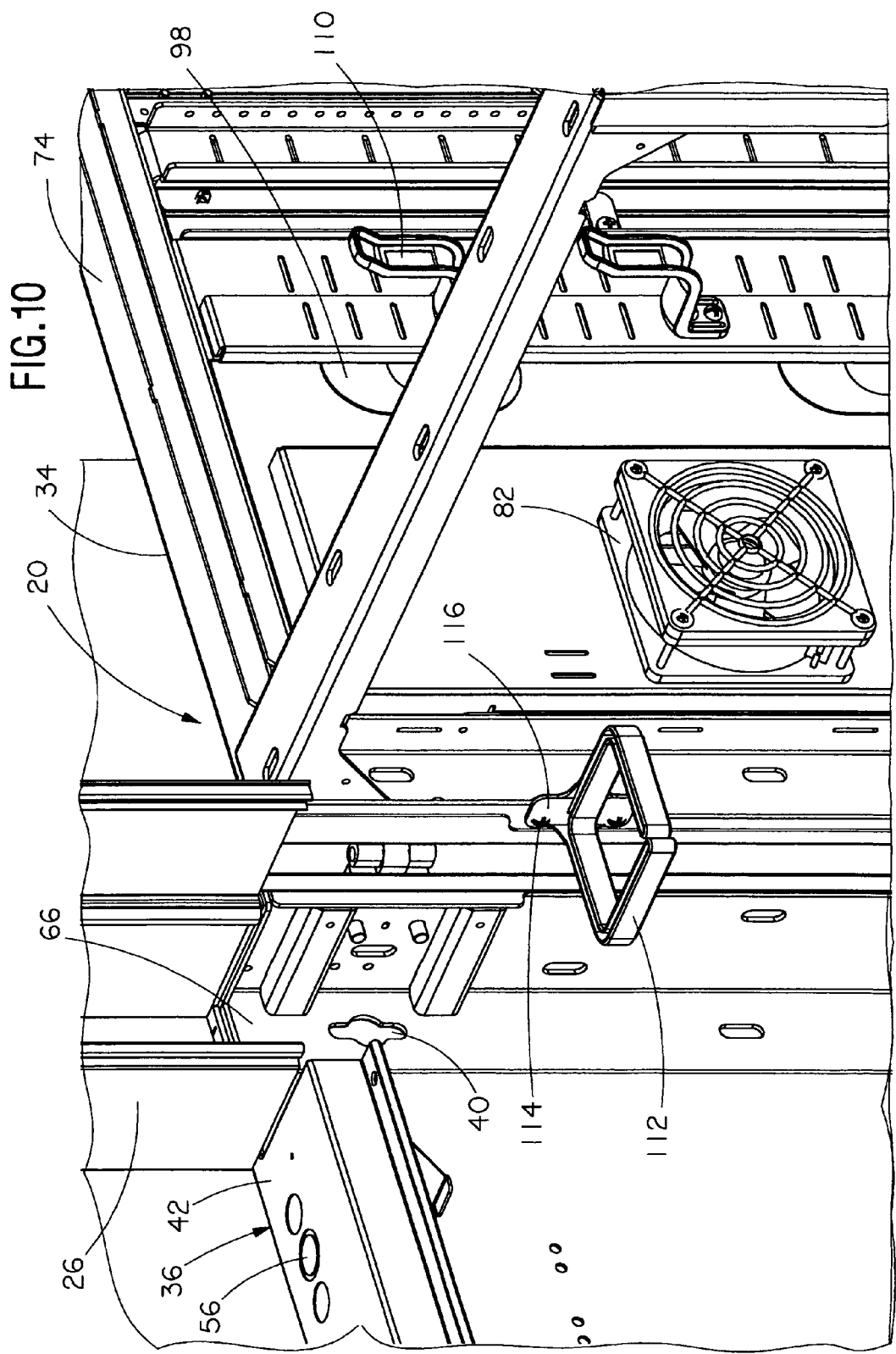
FIG. 10 is an enlarged view of the wall mount cabinet system of FIG. 5.
Figure 11:
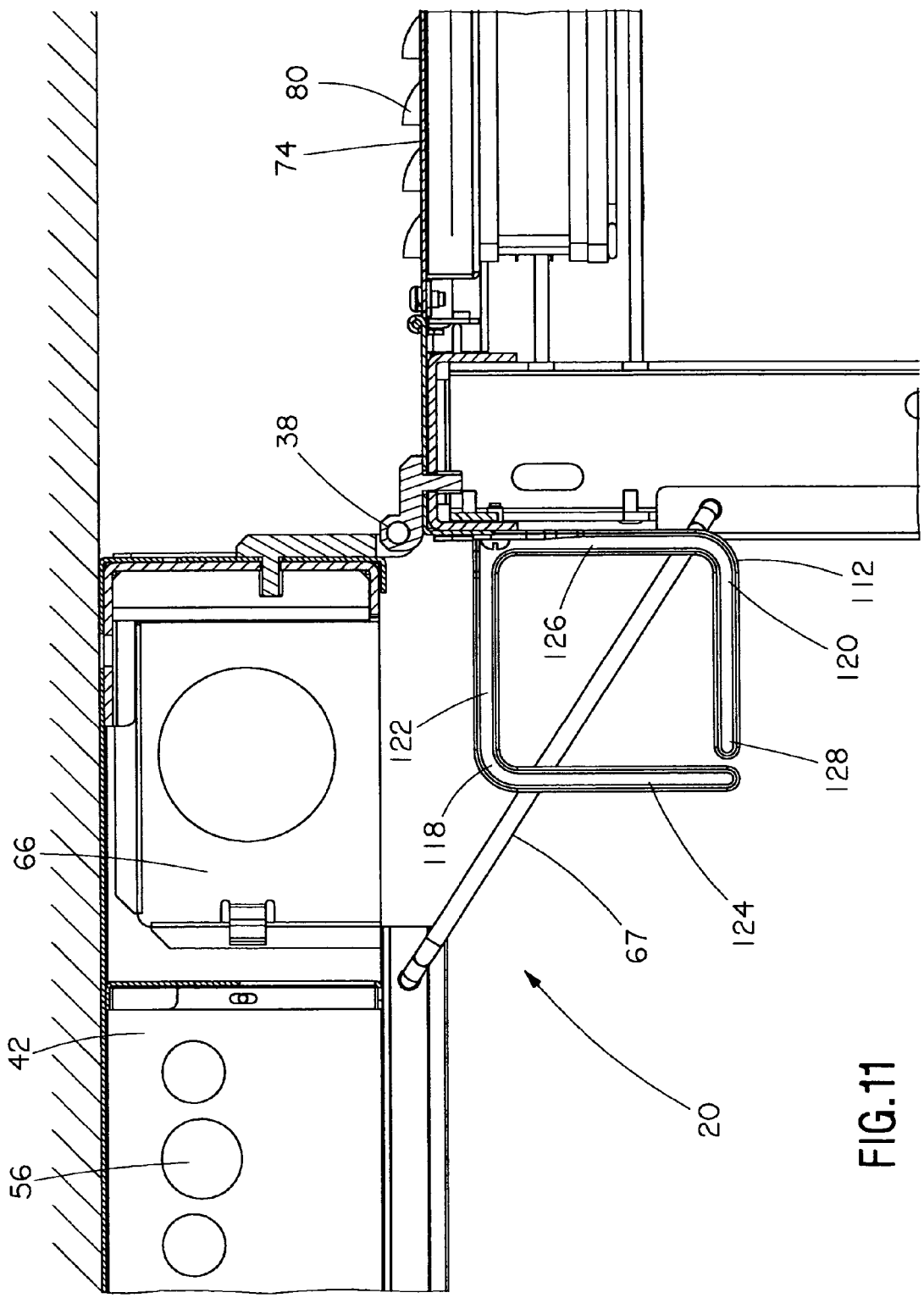
FIG. 11 is a top view of the wall mount cabinet system of FIG. 10.

As shown in FIGS. 5 and 10, rear section 36 has a cutout area 66 at one end of top side 42 adjacent right side 48. When cabinet 22 is in a closed position, cutout area 66 is vertically aligned with hinged duct 26, as best seen in FIG. 12, to allow cables 28 to pass vertically therethrough into cabinet 22. Cutout area 66 allows cables 28 to be installed without having to thread cables 28 through an opening or a knockout. As best seen in FIGS. 9 and 11, pivot point 38 is located adjacent cutout area 66. The proximity of pivot point 38 to cutout area 66 minimizes movement of cables 28 when cabinet 22 is moved from the closed position to the open position, as cables 28 rotate about pivot point 38. As shown in FIG. 13, when cabinet 22 is moved from the closed position to the open position, cables 28 are displaced within hinged duct 26 as cables 28 rotate about pivot point 38.

As best seen in FIG. 11, rod 67 is inserted into a slot in each of front section 34 and rear section 36. Rod 67 maintains front section 34 in an open position about 90 degrees from rear section 36. It is likewise contemplated that rod 67 may be sized and configured to maintain front section 34 in an open position at any angular orientation between 0 and about 100 degrees with respect to rear section 36. Without rod 67 in place, front section 34 has a tendency to move toward rear section 36 and, thus, make it difficult for a user to have uninterrupted access to cables 28. When not in use, rod 67 may be secured to the inside surface of rear section 36 utilizing a clip or other securement devices known in the art.

As shown in FIGS. 1 and 2, front section 34 of cabinet 22 includes a top panel 68, a front door 70, a left side access panel 72 and a right side access panel 74. Left side access panel 72 and right side access panel 74 are hingedly connected to cabinet 22. Similarly, front door 70 is hingedly connected to cabinet 22. Although front door 70 is shown in FIGS. 1-7 as solid, it is likewise contemplated that front door 70 may have a transparent window 76, as best seen in FIG. 14. Each of front door 70, left side access panel 72 and right side access panel 74 is provided with locks for security and are keyed alike. Similarly, front section 34 is provided with a lock for security and is keyed alike.

Figure 4:
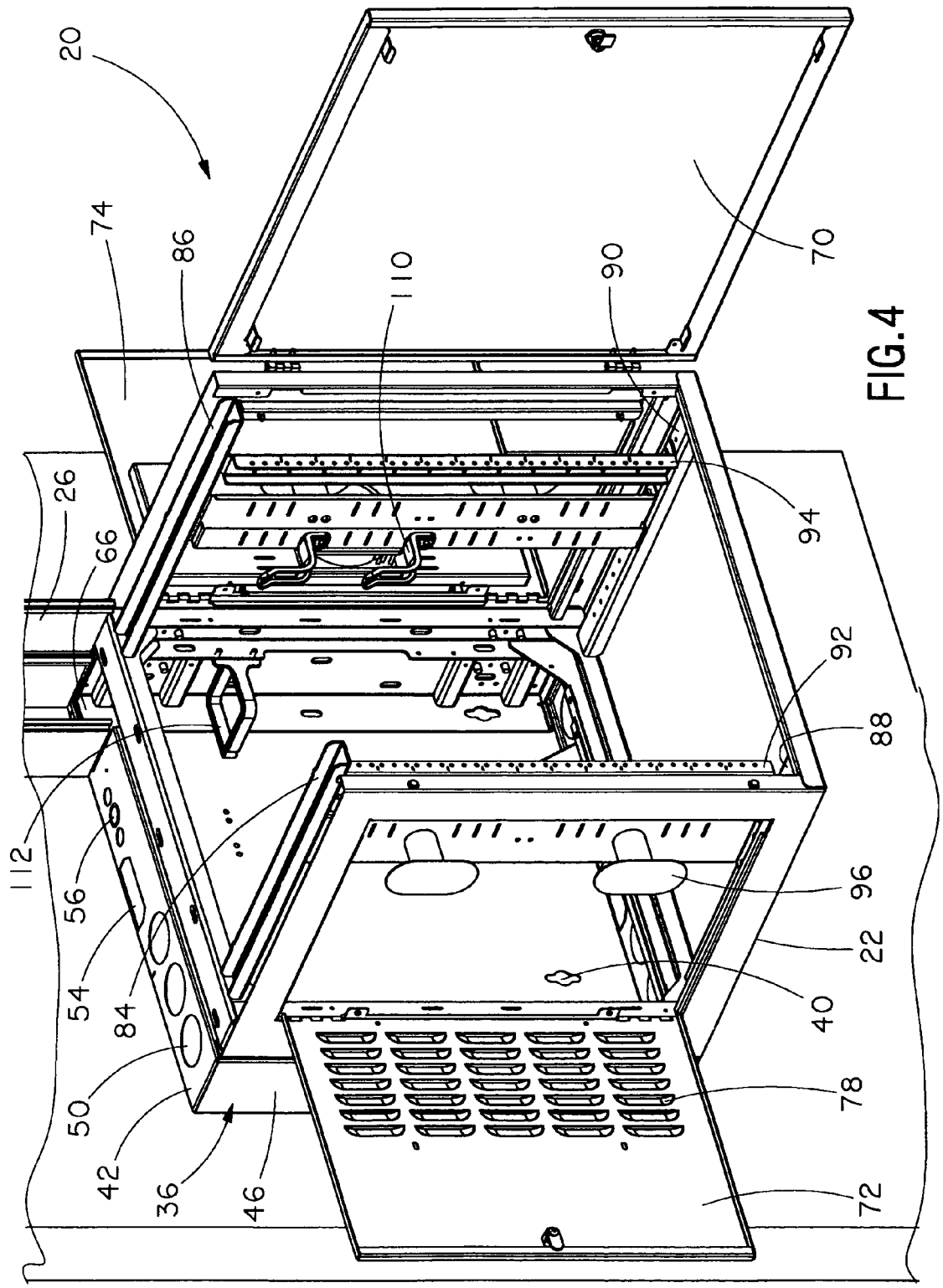
FIG. 4 is an enlarged view of the wall mount cabinet system of FIG. 1, showing the top panel removed and the front door and left and right side access panels in an open position.
Figure 5:
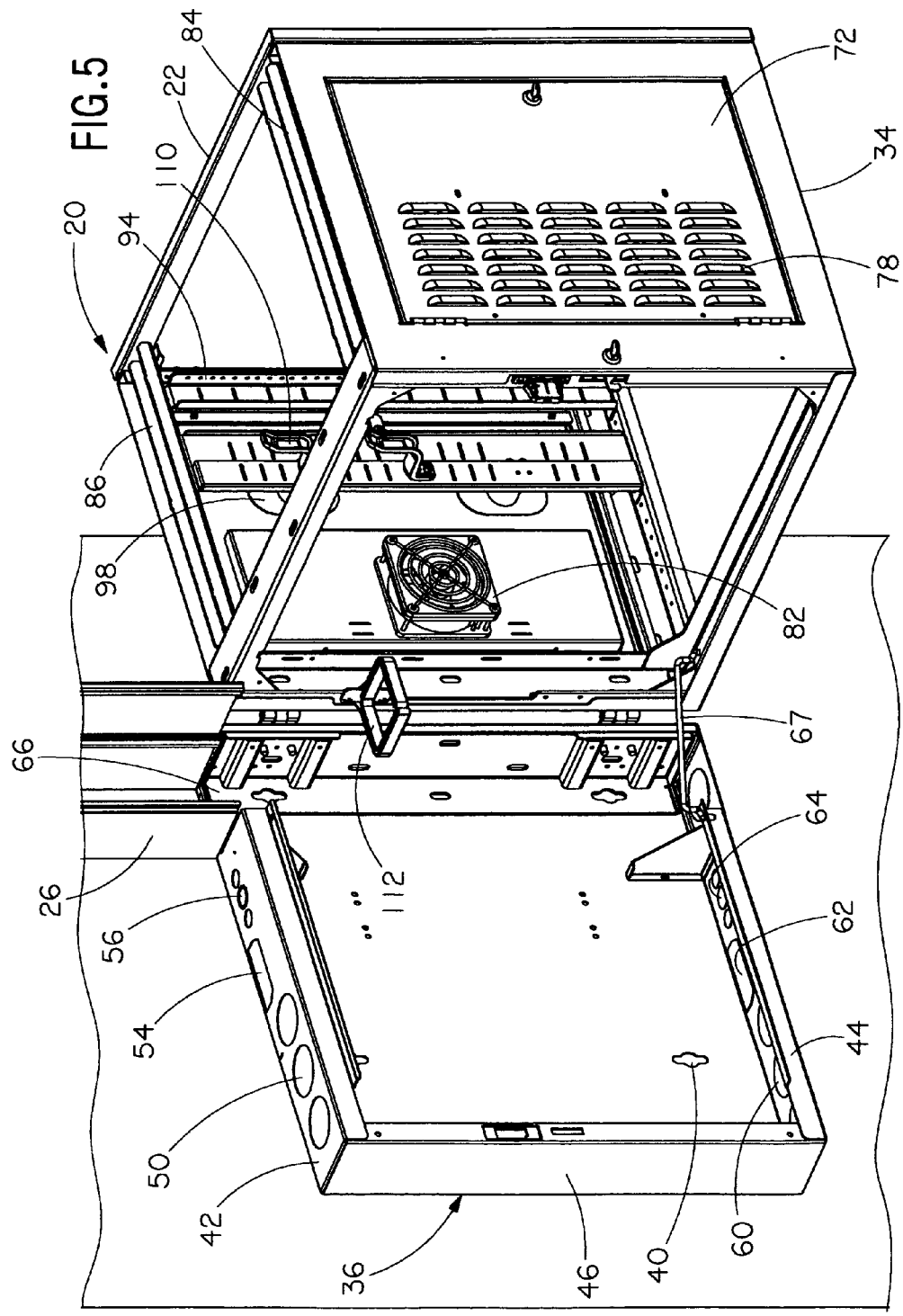
FIG. 5 is an enlarged view of the wall mount cabinet system of FIG. 1, showing the top panel removed and the cabinet in an open position.
Figure 6:
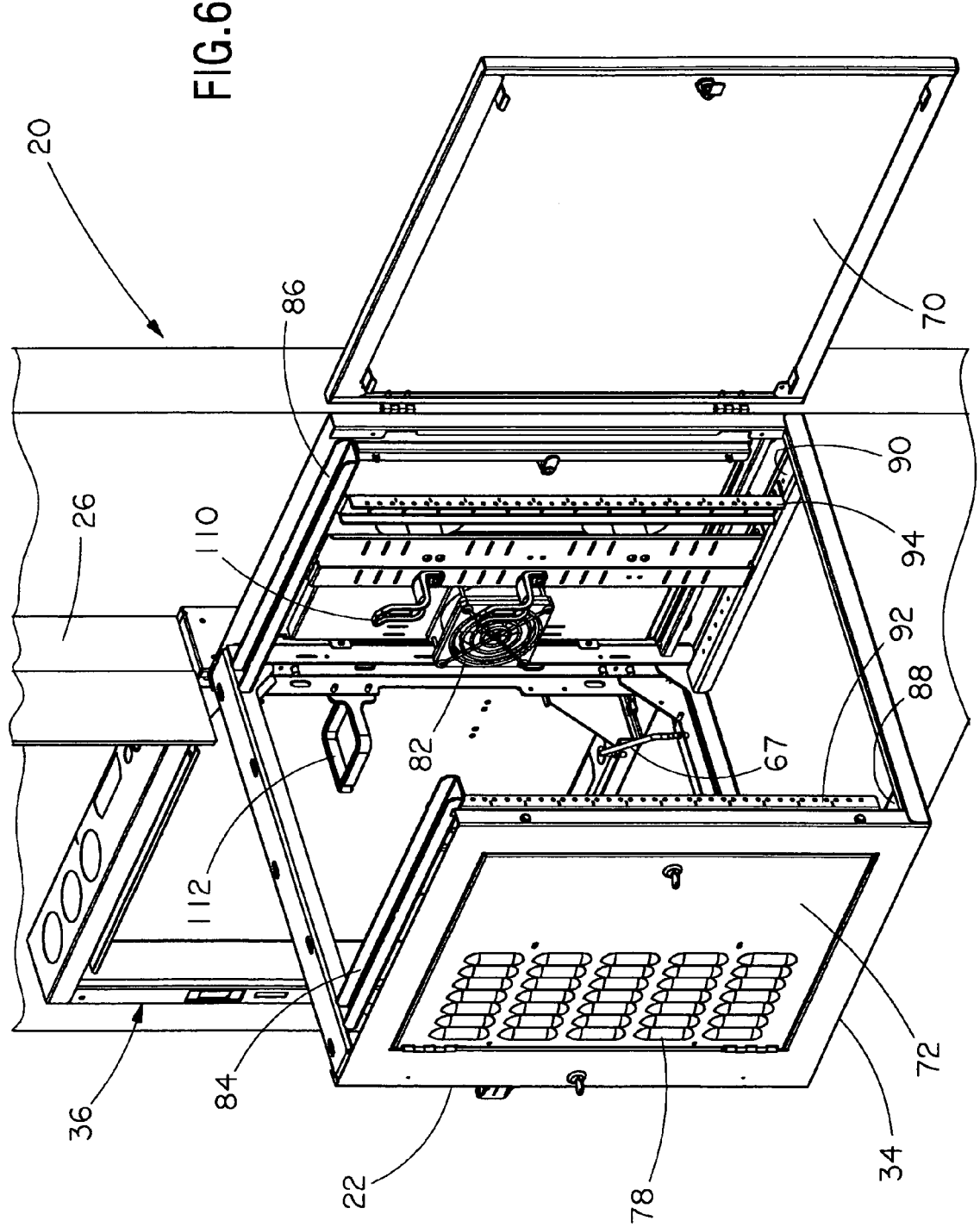
FIG. 6 is an enlarged view of the wall mount cabinet system of FIG. 2, with the top panel removed and the front door and cabinet in an open position.
Figure 7:
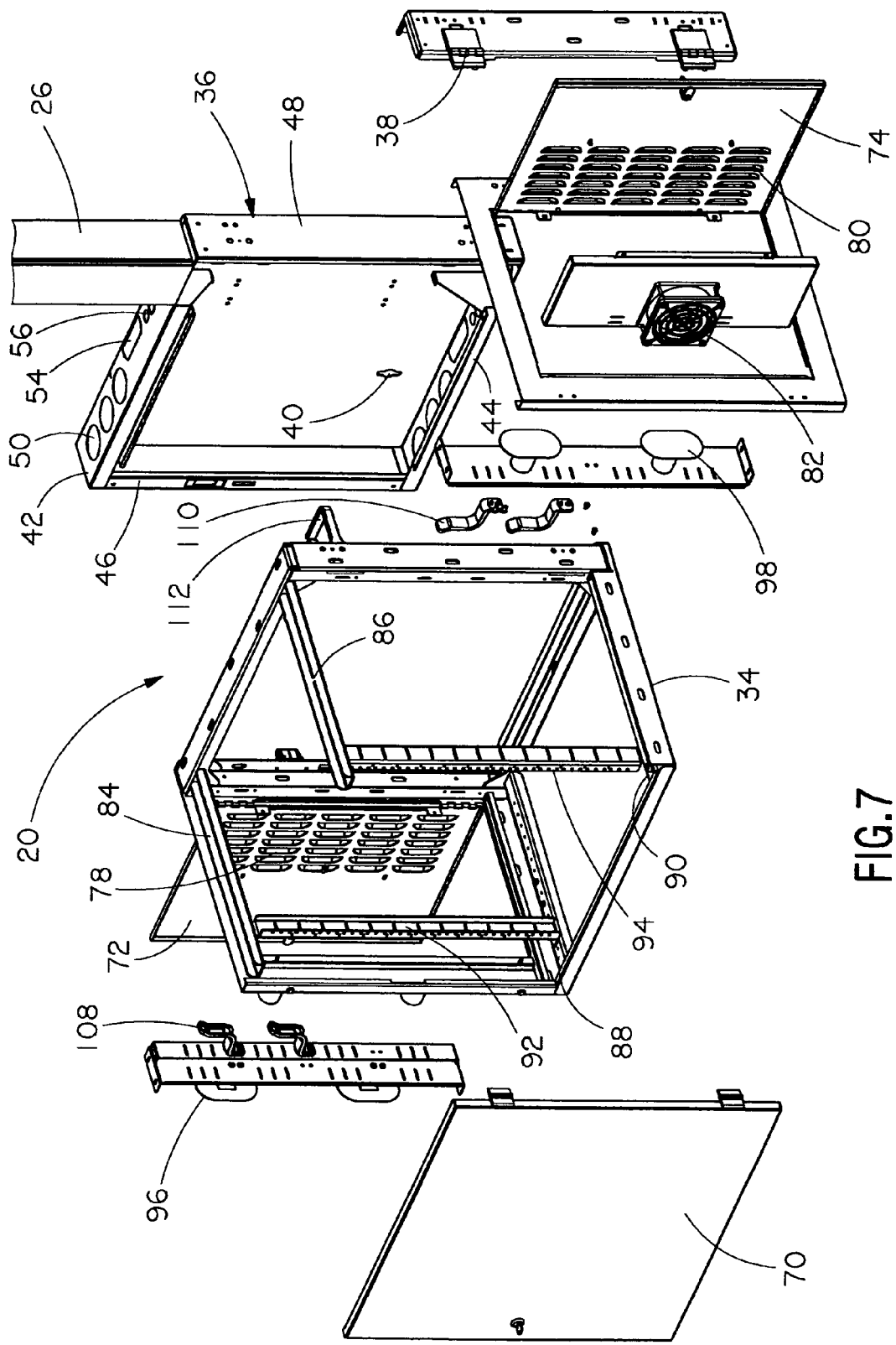
FIG. 7 is an exploded view of the wall mount cabinet system of FIG. 2.

As shown in FIG. 4, left side access panel 72 includes vent louvers 78 to optimize air flow and ventilation within cabinet 22. Similarly, as shown in FIG. 2, right side access panel 74 includes vent louvers 80 to optimize air flow and ventilation within cabinet 22. Moreover, as best seen in FIG. 3, right side access panel 74 may include a fan assembly 82 secured therein. Alternatively, left side access panel 72 may include fan assembly 82 secured therein.

As best seen in FIG. 4, front section 34 of cabinet 22 has two top rails 84, 86, each rail extending from near front door 70 to near rear section 36 of cabinet 22. Similarly, front section 34 includes two bottom rails 88, 90 extending from near front door 70 to near rear section 36 of cabinet 22. Preferably, bottom rails 88, 90 are vertically aligned with top rails 84, 86, respectively. Moreover, two vertical rails 92, 94 are mounted to top rails 84, 86 and bottom rails 88, 90, respectively, near front door 70. Vertical rails 92, 94 are adjustable from front to rear in one inch increments. Preferably, vertical rails 92, 94 include marking indicia thereon.

Figure 8:
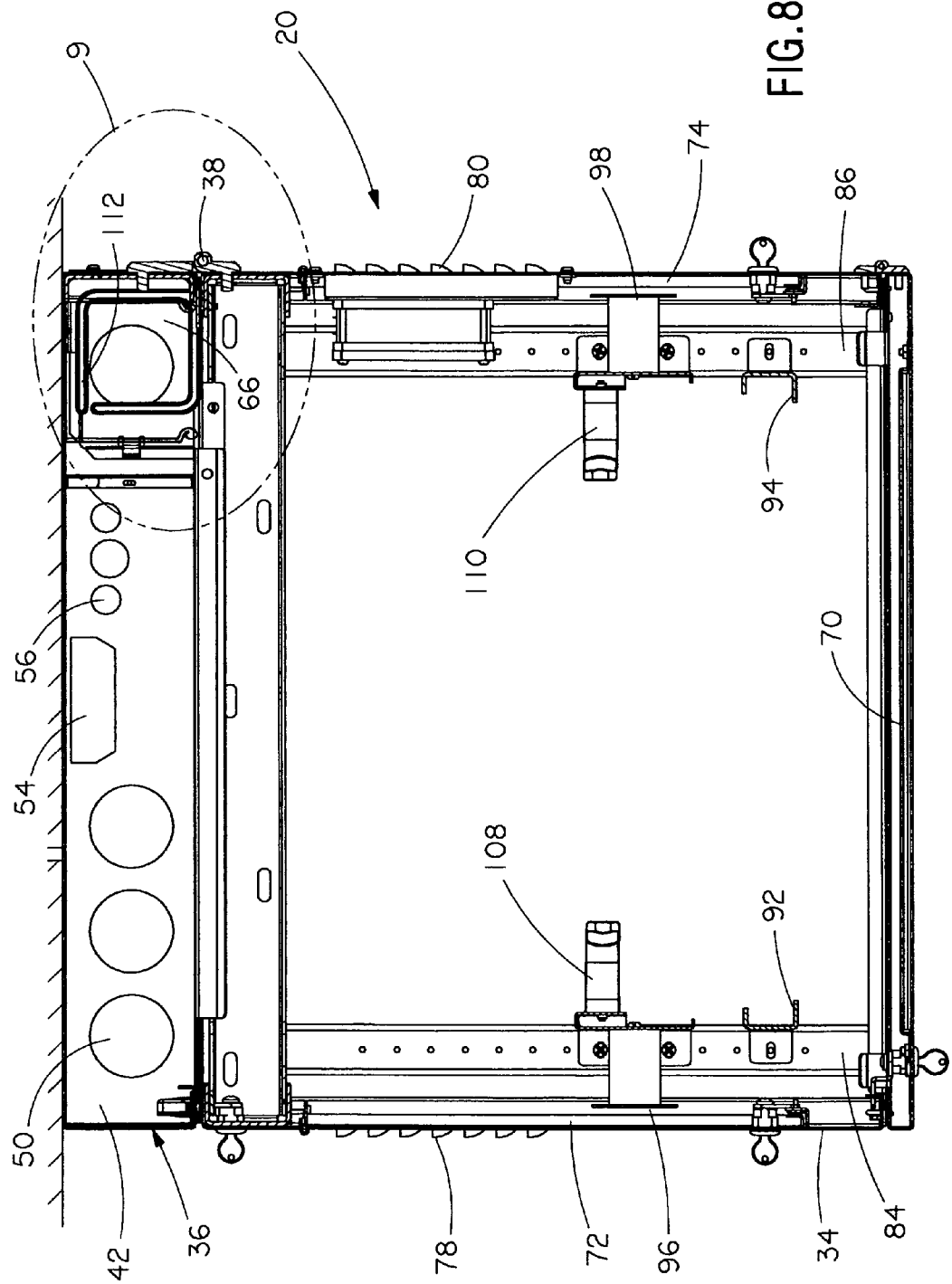
FIG. 8 is a cross-sectional view of the wall mount cabinet system taken along lines 8-8 of FIG. 2.

As best seen in FIGS. 4 and 8, a slack cable manager 96 is secured to top rail 84 and bottom rail 88, adjacent left side access panel 72. Slack cable manager 96 provides slack storage for multiple length patch cords and is adjustable from front to rear in one inch increments. Similarly, as best seen in FIGS. 3 and 8, a slack cable manager 98 is secured to top rail 86 and bottom rail 90, adjacent right side access panel 74. Slack cable manager 98 provides slack storage for multiple length patch cords and is adjustable from front to rear in one inch increments.

As best seen in FIG. 12, front section 34 of cabinet 22 includes three horizontal cable managers, such as cable manager 100 without a cover and cable manager 102 with a hinged cover. Further, front section 34 of cabinet 22 includes two patch panels 104. Each of horizontal cable managers 100, 102 and patch panels 104 is secured to vertical rails 92, 94. Moreover, front section 34 of cabinet 22 includes active equipment 106, such as a Cisco® catalyst switch or a Nortel® baystack, secured to vertical rails 92, 94. Vertical rails 92, 94 are adjustable from front to rear, even after installation of slack cable managers 96, 98, horizontal cable managers 100, 102, patch panels 104 or active equipment 106. Preferably, cabinet 22 is 24 inches in depth to accommodate typical active equipment.

As best seen in FIG. 8, S-hooks 108, 110 may be secured to slack cable managers 96, 98, respectively. S-hooks 108, 110 manage cables within front section 34 of cabinet 22. S-hook 108 is positioned adjacent left side access panel 72, and S-hook 110 is positioned adjacent right side access panel 74. Alternatively, a D-ring (not shown), such as the one disclosed in U.S. Pat. No. 6,427,952, which is hereby incorporated by reference, may be utilized instead of S-hooks 108, 110.

As best seen in FIG. 5, front section 34 of cabinet 22 includes a flexible D-ring 112 secured to a back edge of front section 34. As shown in FIGS. 4 and 12, when cabinet 22 is in the closed position, D-ring 112 is vertically aligned with cutout area 66 in rear section 34 of cabinet 22. D-ring 112 may be rotatably flexed to an open position which allows access to the maximum extent of the opening, thus permitting easier access for the larger cables or bundles of cables. As shown in FIG. 10, D-ring 112 includes mounting holes 114 on baseplate 116 which secures D-ring 112 in a desired position on front section 34 of cabinet 22. Preferably, D-ring 112 is formed of a strong but flexible, resilient plastic material, to have significant resistance to the flexing.

As best seen in FIG. 11, D-ring 112 has a baseplate 116 including a first arm 118 and a second arm 120. Preferably, first arm 118 and second arm 120 are substantially L-shaped. First arm 118 has a proximate portion 122 which extends in a generally linear fashion away from baseplate 116, and a distal portion 124 oriented substantially 90 degrees from proximate portion 122. First arm 118 may be twisted or rotated in either direction (up or down) at least 90 degrees. Similarly, second arm 120 has a proximate portion 126 which extends in a generally perpendicular fashion away from baseplate 116, and a distal portion 128 oriented substantially 90 degrees from proximate portion 126. Second arm 120 may be twisted or rotated in either direction (up or down) at least 90 degrees. Thus, D-ring 112 provides access to cables 28 secured therein from two directions. The twisting movement of first arm 118 and second arm 120 may be controlled by a desired cross-section and material selection. Consequently, a large number of cables, or large cables, may be expeditiously placed in or removed from D-ring 112 as a contiguous unit rather than on a piece-by-piece basis as is often required with prior art structures.

In operation, cabinet 22 is mounted to wall 24 adjacent hinged duct 26, as shown in FIGS. 1-3. As best seen in FIG. 13, front section 34 of cabinet 22 and hinged duct 26 are opened to allow access to cables 28 passing vertically through hinged duct 26 and into front section 34 of cabinet 22. Preferably, cables 28 are routed through D-ring 112, over S-hooks 108, 110 and into patch panels 104, horizontal cable managers 100, 102, active equipment 106 or slack cable managers 96, 98. When cabinet 22 is in a closed position, access to cables 28 is provided through left side access panel 72 and right side access panel 74, as shown in FIG. 12.

The disclosed invention provides a wall mount cabinet system having a cutout area in the rear section of the cabinet that offers the ability to install cables within the cabinet without having to thread the cables through an opening or knockout. It should be noted that the above-described illustrated embodiments and preferred embodiments of the invention are not an exhaustive listing of the forms such a wall mount cabinet system in accordance with the invention might take; rather, they serve as exemplary and illustrative of embodiments of the invention as presently understood. By way of example, and without limitation, the wall mount cabinet system may have more than one cutout area to allow the cabinet to open in either direction. Many other forms of the invention are believed to exist.

The invention claimed is:

1. A wall mount cabinet comprising:
   a rear section having a top side, a bottom side and a first side between the top side and the bottom side, the rear section including a cutout extending from the first side along a portion of the top side, wherein the cutout is adapted to receive a plurality of cables; and
   a front section hingedly connected to the rear section at a pivot point immediately adjacent the cutout, the front section having a D-ring secured to a back edge of the front section immediately adjacent the pivot point, wherein the D-ring is adapted to enclose the plurality of cables,
   wherein the proximity of the pivot point to the cutout and the D-ring minimizes movement of the plurality of cables when the front section of the cabinet is moved from a closed position to an open position.

2. The wall mount cabinet of claim 1, further comprising a hinged duct or transition duct positioned immediately adjacent the cutout.

3. The wall mount cabinet of claim 1, further comprising two side access panels hingedly connected to the front section.

4. The wall mount cabinet of claim 1, further comprising a front door hingedly connected to the front section, wherein the front door includes a transparent window.

5. The wall mount cabinet of claim 4, wherein the front section includes a rail mounted therein, the rail is adjustable from adjacent the front door to adjacent the rear section.

6. The wall mount cabinet of claim 1, further comprising a rod which maintains the front section in an open position about 90 degrees from the rear section.

7. The wall mount cabinet of claim 1, wherein the front section includes a slack cable manager secured to a rail mounted therein.

8. The wall mount cabinet of claim 1, wherein the front section includes a patch panel secured to a rail mounted therein.

9. The wall mount cabinet of claim 1, wherein the front section includes a horizontal cable manager secured to a rail mounted therein.

10. The wall mount cabinet of claim 1, wherein the front section includes active equipment secured to a rail mounted therein.

* * * * *